Dec. 12, 1961    M. E. BOURNS    3,013,234
PRESSURE RESPONSIVE ELECTRICAL INSTRUMENTS
Original Filed June 14, 1956
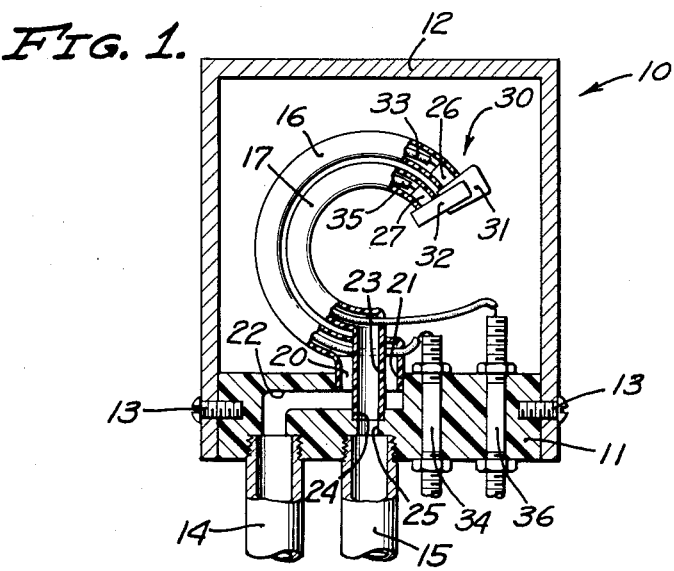
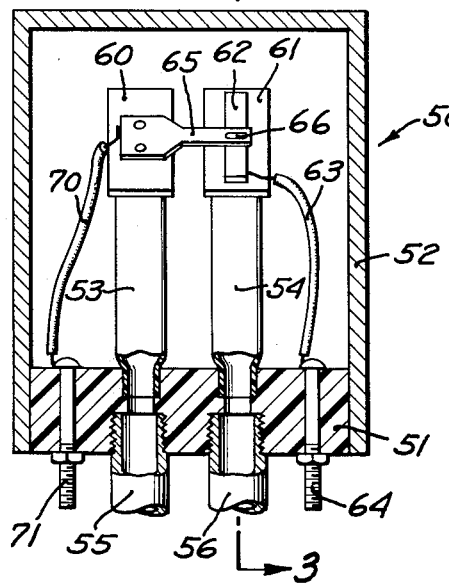
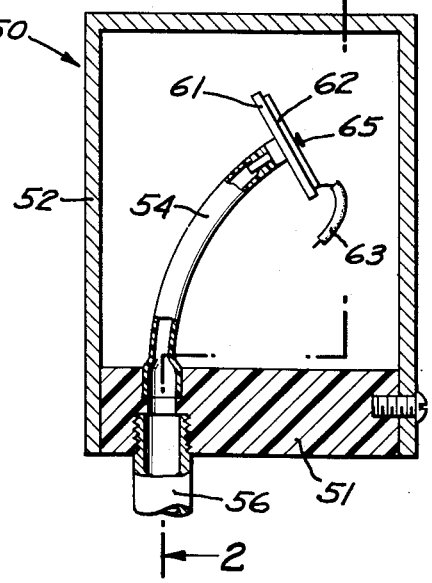
INVENTOR.
MARLAN E. BOURNS
BY
Herbert E. Kidder
AGENT

United States Patent Office 3,013,234
Patented Dec. 12, 1961

3,013,234
PRESSURE RESPONSIVE ELECTRICAL INSTRUMENTS
Marlan E. Bourns, 2482 Carlton Place, Riverside, Calif.
Continuation of application Ser. No. 591,370, June 14, 1956. This application Apr. 11, 1960, Ser. No. 21,362
4 Claims. (Cl. 338—40)

The present invention relates to pressure responsive instruments, and is a continuation of my pending application, Serial No. 591,370, filed June 14, 1956, now Patent No. 2,932,807, entitled Pressure Responsive Electrical Instruments.

More specifically, the present invention relates to differential pressure transducers of the type embodying an electrical signal means for measuring a fluid pressure against either a vacuum, atmospheric pressure, or a second fluid pressure as a reference. The primary object of the present invention is to provide a sensitive pressure transducer which is relatively immune to the effects of shock, vibration, and acceleration. This is an important advantage, inasmuch as pressure transducers of this type are frequently exposed to severe conditions of vibration and acceleration, while being called upon to deliver accurate pressure response, free of vibration and acceleration error.

Another object of the invention is to provide a pressure transducer of the type described, wherein the electrical output is not affected by temperature changes.

A further object of the invention is to provide a differential pressure responsive instrument which is simple and inexpensive to manufacture, while at the same time rugged in construction and having an extremely sensitive and accurate response to fluid pressure conditions.

Still another object of the invention is to provide a new type of pressure responsive element having the general configuration of a bourdon tube, but being formed of non-metallic, corrosion resistant, chemically inert, synthetic resin materials of the type referred to generally as "plastics."

These and other objects and advantages of the present invention will become apparent to those skilled in the art upon consideration of the following detailed description of the preferred embodiment thereof, reference being had to the accompanying drawings, wherein:

FIGURE 1 is a sectional view taken through an instrument embodying the principles of the present invention;

FIGURE 2 is a similar sectional view through another embodiment of the invention, as seen at 2—2 in FIGURE 3; and FIGURE 3 is a sectional view, taken at 3—3 in FIGURE 2.

In FIGURE 1 of the drawings, the reference numeral 10 designates one embodiment of the invention which includes a housing consisting of a base 11 and cover 12. The base 11 is preferably formed of dielectric material such as plastic, ceramic, or the like, and the cover 12 is a metal cup extending down over the edges of the base 11 and secured thereto by screw 13. Screwed into tapped holes in the bottom of the base 11 are two threaded pipes 14 and 15, which are connected to sources of fluid pressure (not shown).

Mounted within the housing are two arcuately curved bourdon tubes 16 and 17 which are disposed concentric to one another and in the same vertical plane. Each of the bourdon tubes 16, 17 has a fixed end which is attached to the base 11, and a free end which is movable within said vertical plane responsive to changes in the pressure differential between the inside and outside of the bourdon tube.

The outer bourdon tube 16 terminates at its bottom end in a downwardly projecting cylindrical neck 20 of enlarged diameter, which is received within an aperture 21 in the base 11. The interior of the bourdon tube 16 opens into a passageway 22 in the base 11, which connects with the interior of the pipe 14, so that fluid pressure carried by the latter is admitted to the interior of the outer bourdon tube 16. The inner bourdon tube 17 terminates at its bottom end in a downwardly projecting cylindrical neck 23 of reduced diameter, which passes through the wall of the outer bourdon tube 16 and extends down through the neck 20, concentric therewith. The bottom end of the neck 23 is received within an aperture 24 in the base 11, and is connected by a short passageway 25 with the interior of pipe 15. At the point where inner bourdon tube 17 passes through the wall of the outer bourdon tube 16, the two tubes are sealed together so that there is no leakage of pressure fluid.

The free, movable ends of the bourdon tubes 16 and 17 are sealed by plugs 26 and 27, respectively, each of which supports one of two relatively movable parts comprising the electrical signal means 30. This signal means 30 may take any desired form, but in the illustrated embodiment is shown as a capacitor consisting of two relatively movable capacitor plates 31 and 32. Plate 31 is mounted on the movable end of the outer bourdon tube 16, while the other plate 32 is supported on the free end of the inner bourdon tube 17. The two capacitor plates 31, 32 overlap one another and are spaced apart, and their capacitance is a function of their relative positions with respect to one another.

Capacitor plate 31 is connected by a wire 33 to a first terminal post 34, while the other plate 32 is connected by a wire 35 to a second terminal post 36. The two terminal posts 34 and 36 may be connected into any suitable electrical circuit, and the electrical signal produced by displacement of one of the plates 31, 32 with respect to the other can be amplified and utilized to drive a meter or other instrument, so as to show the fluid pressure values.

The concentric arrangement of the bourdon tubes, as shown in FIGURE 1, has an important advantage in that the two bourdon tubes tend to move together in synchronism when the instrument is exposed to shock, acceleration, or vibration. The two bourdon tubes 16 and 17 should preferably be so proportioned so that their spring constants are substantially the same, so that their free ends will move in unison, and the capacitor plates 31, 32 will not be displaced with respect to one another, but maintain a relatively fixed relationship. Any tendency of either one of the capacitor plates 31, 32 to shift its position under the influence of temperature change is counteracted by a tendency on the part of the other plate to move a similar distance in the same direction. Thus, the output of the electrical signal means 30 is unaffected by temperature change.

One important feature of the present invention is that the two bourdon tubes 16, 17 are formed of a non-corrosive, chemically inert, synthetic resin material, which is immune to attack by most of the corrosive gases or fluids now in use. Suitable materials from which the bourdon tubes may be made are the various polyester-styrene copolymers, styrene compositions, epoxy compositions, and the like. These compositions can be altered or modified in an infinite variety of ways, and can include various conductive or non-conductive fillers modifying their thermal expansion characteristics. If desired, they may be provided with an exterior or interior film of polyvinyl alcohol or other coating so as to resist any tendency of the fluid media to pass through the walls of the tube.

Another embodiment of the invention, designated by the reference numeral 50, is illustrated in FIGURES 2 and 3. In this embodiment, the housing consists of a base 51 and cover 52, and mounted side by side within the housing are two arcuately curved bourdon tubes 53 and 54. The fixed ends of the tubes 53, and 54 are attached to the base 51 and communicate with pipes 55 and 56, respectively. Mounted on the free, movable ends of the bourdon tubes 53, 54, are supports 60 and 61, respectively. A resistance element 62 is secured on the support 61 with its lengthwise dimension, or longitudinal axis, extending generally parallel to the line of travel of the free end of the bourdon tube. The resistance element 62 is connected at one end by a wire 63 to a terminal post 64 in the base 51.

Mounted on the other support 60 and projecting laterally therefrom is a spring contact finger 65, which projects over the top of the element 62 and has a narrow ridge 66 at its end which wipes on the element 62 to make electrical contact therewith. The contact 65 is connected by a wire 70 to a second terminal post 71 in the base 51. If desired, the resistance element 62 may be connected at its other end to another terminal post, so that the electrical signal means may be used as a potentiometer.

As in the previous case, the two bourdon tubes 53 and 54, are substantially identical in configuration and have substantially the same spring constant. Thus, the free ends of the bourdon tubes tend to move in unison when the instrument is subjected to acceleration or vibration forces, and such forces produce no relative displacement of the contact 65 with respect to the element 62. Also, any tendency of the contact 65 to be displaced by the effects of temperature change is counteracted by a corresponding displacement of the element 62, and the instrument is thus relatively immune to the effects of temperature.

While I have shown and described in considerable detail two illustrative forms of the invention, it will be understood by those skilled in the art that various changes may be made in the shape and arrangement of the several parts without departing from the broad scope of the invention, as defined in the appended claims.

I claim:

1. A differential pressure responsive instrument comprising a housing having a base, a pair of arcuately curved bourdon tubes disposed concentric with respect to one another and in the same plane, each bourdon tube having a fixed end secured to said base and a free end which is movable within said plane responsive to changes in the pressure differential between the inside and outside of the bourdon tube, means for introducing fluid pressure media from two different pressure sources to the interiors of said bourdon tubes, and electrical signal means consisting of a pair of relatively movable parts which cooperate to produce a signal that is a function of the difference between said two fluid pressures, one of said parts being mounted on the free end of one of said bourdon tubes, and the other part being mounted on the free end of the other bourdon tube.

2. A pressure responsive instrument as defined in claim 1, wherein said electrical signal means consists of a pair of capacitor electrodes.

3. A pressure responsive instrument as defined in claim 1, wherein said bourdon tubes are formed of synthetic resin material.

4. A pressure sensitive element comprising a coiled, flattened tube of synthetic resin material having the properties of corrosion resistance, chemical inertness, and electrical non-conductivity, one end of said tube being fixed and the other end thereof being closed and being movable responsive to changes in the pressure differential between the inside and outside of the tube, said other end of said tube being closed, and means for introducing fluid pressure into said tube through said one end thereof.

References Cited in the file of this patent
UNITED STATES PATENTS

| | | |
|---|---|---|
| 1,791,240 | Heise | Feb. 3, 1931 |
| 2,622,177 | Klose | Dec. 16, 1952 |
| 2,906,980 | Traite | Sept. 29, 1959 |